(12) United States Patent
Gong

(10) Patent No.: US 10,728,647 B2
(45) Date of Patent: Jul. 28, 2020

(54) DATA TRANSMITTING METHOD AND SYSTEM

(71) Applicant: GUANGDONG OPPO MOBILE TELECOMMUNICATIONS CORP., LTD., Dongguan, Guangdong (CN)

(72) Inventor: Jinhua Gong, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/586,458

(22) Filed: Sep. 27, 2019

(65) Prior Publication Data
US 2020/0107108 A1 Apr. 2, 2020

(30) Foreign Application Priority Data

Sep. 30, 2018 (CN) .......................... 2018 1 1161282

(51) Int. Cl.
*H04W 40/02* (2009.01)
*H04W 4/80* (2018.01)
(Continued)

(52) U.S. Cl.
CPC ........... *H04R 1/1041* (2013.01); *H04L 12/42* (2013.01); *H04R 1/1016* (2013.01); *H04W 4/80* (2018.02);
(Continued)

(58) Field of Classification Search
CPC ....... H04W 76/10; H04W 4/80; H04W 40/02; H04M 1/6066; H04M 2250/02;
(Continued)

(56) References Cited

U.S. PATENT DOCUMENTS 6,084,950 A * 7/2000 Pinault ................... H04M 3/51
379/442
9,820,323 B1 11/2017 Young et al.
(Continued)

FOREIGN PATENT DOCUMENTS

CN 1453963 11/2003
CN 101577954 11/2009
(Continued)

OTHER PUBLICATIONS

EPO, Office Action for EP Application No. 19200426.5, dated Dec. 20, 2019.
(Continued)

*Primary Examiner* — Andrew Wendell
(74) *Attorney, Agent, or Firm* — Hodgson Russ LLP

(57) ABSTRACT

The embodiments of the present disclosure provide a data transmitting method and a system. The target bluetooth earphone is applied to a data transmitting system. The data transmitting system includes a mobile terminal and a plurality of earphones, the mobile terminal and the plurality of bluetooth earphones are connected in sequence thereby forming a connection loop, in which each of the plurality of bluetooth earphones corresponds to two transmission paths for transmitting audio data to the mobile terminal. In the method, the target bluetooth earphone receives audio data. The target bluetooth earphone determines a target device, wherein the target device is adjacent to the target bluetooth earphone in the connection loop and on the shorter of the two transmission paths, and the target device is one of the plurality of bluetooth earphones or the mobile terminal. The target bluetooth earphone transmits the audio data to the target device.

20 Claims, 4 Drawing Sheets

(51) Int. Cl.
  *H04R 1/10* (2006.01)
  *H04W 76/10* (2018.01)
  *H04L 12/42* (2006.01)

(52) U.S. Cl.
  CPC ......... *H04W 76/10* (2018.02); *H04R 2420/07* (2013.01)

(58) Field of Classification Search
  CPC . H04B 2001/3872; H04L 12/42; H04L 45/12; H04L 12/4625; H04L 45/126; H04R 1/1041; H04R 1/1016; H04R 12/42; H04R 2420/07
  See application file for complete search history.

(56) References Cited

U.S. PATENT DOCUMENTS

| | | | |
|---|---|---|---|
| 10,367,540 B1* | 7/2019 | Medapalli | H04B 1/406 |
| 2012/0195314 A1 | 8/2012 | Ramanujam et al. | |
| 2015/0341973 A1* | 11/2015 | El-Hoiydi | H04W 68/005 |
| | | | 455/3.06 |
| 2018/0035207 A1 | 2/2018 | Hsu | |
| 2020/0107127 A1* | 4/2020 | Gong | H04W 76/15 |

FOREIGN PATENT DOCUMENTS

| | | |
|---|---|---|
| CN | 103262467 | 8/2013 |
| CN | 103391118 | 11/2013 |
| CN | 103686516 | 3/2014 |
| CN | 105208511 | 12/2015 |
| CN | 105323170 | 2/2016 |
| CN | 109246671 | 1/2019 |
| GB | 2436188 | 9/2007 |

OTHER PUBLICATIONS

"Introduction to Bluetooth mesh technology," Qianqian, Nov. 9, 2019, <www.elecfans.com>.

SIPO, First Office Action for CN Application No. 201811161282.8, dated Dec. 5, 2019.

WIPO, English translation of the ISR and WO for PCT/CN2019/108183, dated Jan. 2, 2020.

* cited by examiner

DATA TRANSMITTING METHOD AND SYSTEM

CROSS-REFERENCE TO RELATED APPLICATION

This application claims priority to a Chinese Patent Application No. 201811161282.8, filed on Sep. 30, 2018, the entire disclosure of which is incorporated herein by reference.

TECHNICAL FIELD

The present disclosure relates to a field of bluetooth device, and particularly to a data transmitting method and a system.

BACKGROUND

With the development of mobile terminal technology and wireless connection technology, the technology of bluetooth earphone is improved and widely used. Wherein, the bluetooth earphone connects to the mobile terminal through bluetooth, and can receive the audio data transmitted by the mobile terminal for audio playback. The data transmission between the earphone and the mobile terminal no longer depends on the wired connection, which makes the earphone more convenient to use. However, the data transmission between the bluetooth earphone and the mobile terminal is single, which cannot meet the requirements of the users.

SUMMARY

In view of the above problems, the present disclosure provides a data transmitting method and a system to improve the above problems.

In a first aspect, the embodiments of the present disclosure provide a data transmitting method, the data transmitting method is applied to a target bluetooth earphone. The target bluetooth earphone is applied to a data transmitting system. The data transmitting system includes a mobile terminal and a plurality of earphones, the mobile terminal and the plurality of bluetooth earphones are connected in sequence thereby forming a connection loop, in which each of the plurality of bluetooth earphones corresponds to two transmission paths for transmitting audio data to the mobile terminal. The target bluetooth earphone is one of the plurality of bluetooth earphones. The method includes the following operations. The target bluetooth earphone receives audio data. The target bluetooth earphone determines a target device, wherein the target device is adjacent to the target bluetooth earphone in the connection loop and on the shorter of the two transmission paths, and the target device is one of the plurality of bluetooth earphones or the mobile terminal. The target bluetooth earphone transmits the audio data to the target device.

In a second aspect, the embodiments of the present disclosure provide a data transmitting method, the data transmitting method is applied to a data transmitting system. The data transmitting system includes a mobile terminal and a plurality of bluetooth earphones, the mobile terminal and the plurality of bluetooth earphones are connected in sequence thereby forming a connection loop. Each of the plurality of bluetooth earphones corresponds to two transmission paths for transmitting audio data to the mobile terminal. The plurality of bluetooth earphones include a first bluetooth earphone and a second bluetooth earphone. The method includes the following operations. The first bluetooth earphone receives audio data. The first bluetooth earphone determining a target device, wherein the target device connects with the first bluetooth earphone via bluetooth in the connection loop and the target device is on the shorter of the two transmission paths. The first bluetooth earphone transmits the audio data to the target device and when the target device is the second bluetooth earphone, the second bluetooth earphone transmits the audio data to a next target device, until the audio data is transmitted to the mobile terminal, wherein the next target device connects with the second bluetooth earphone via bluetooth on the shorter transmission path.

In a third aspect, the embodiments of the present disclosure provide a data transmitting system, wherein the data transmitting system includes a mobile terminal and a plurality of bluetooth earphones, the mobile terminal and the plurality of bluetooth earphones are connected in sequence thereby forming a connection loop, each of the plurality of bluetooth earphones corresponds to two transmission paths for transmitting audio data to the mobile terminal. Each of the plurality of bluetooth earphones is configured to receive audio data; determine a target device, wherein the target device is adjacent to the target bluetooth earphone in the connection loop and on the shorter of the two transmission paths, and the target device is one of the plurality of bluetooth earphones or the mobile terminal; and transmit the audio data to the target device until the audio data is transmitted to the mobile terminal.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings can also be obtained from these drawings without any creative effort.

DETAILED DESCRIPTION

Figure 1:
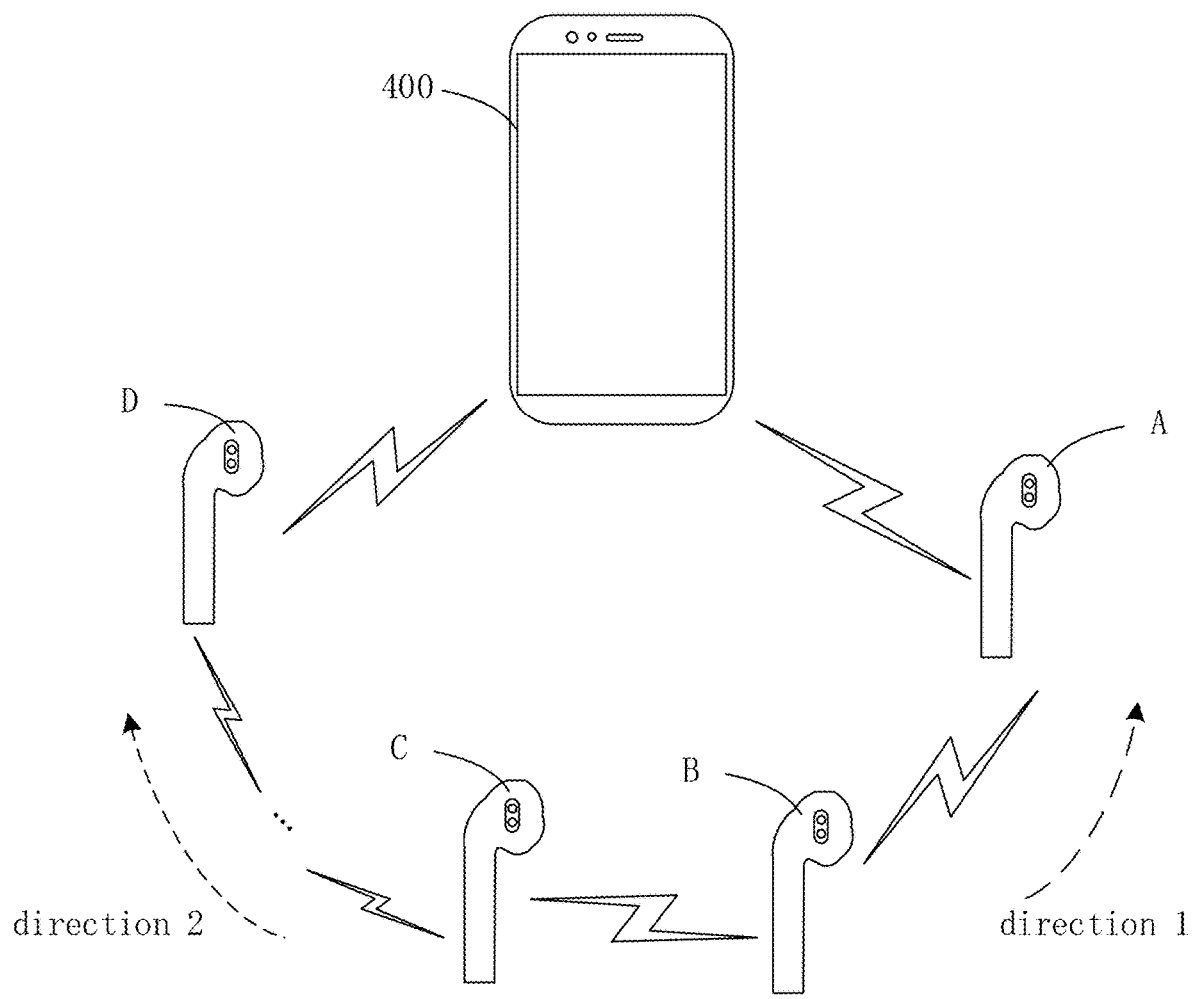
FIG. 1 is a schematic view of a data transmitting system according to embodiments of the present disclosure.

In order to better understand the disclosure for those skilled in the art, the technical solutions in the embodiments of the present disclosure are clearly and completely described in the following with reference to the accompanying drawings in the embodiments of the present disclosure.

With the increase of the types and the improvement of the sound effect for audio play device, more users will choose to output the audio played by mobile terminals such as mobile phones and tablet computers to the audio playback device. Wherein, the audio play devices include car music players, speakers and earphone and so on. Among them, the earphones include wired earphones or wireless earphones.

Taking the earphone as an example, if the earphone is wired earphone, the wired earphone and the mobile terminal are connected by the physical line, and the mobile terminal transmits the audio to the wired earphone through the physical line, so that the wired earphone can play the audio.

In order to liberate the use of the earphone from the wired situation, make the connection between the earphone and the mobile terminal not depend on the physical line and increasing the convenience of the use of the earphone, the wireless earphone comes into being. The wireless earphone establishes a communication link in advance according to the wireless communication protocol supported by the mobile terminal, and then the mobile terminal transmits audio to the wireless earphone through the communication link, so that the wireless earphone can play audio. The wireless communication protocol can include WLAN protocol, bluetooth protocol, ZigBee protocol, and the like. The disclosure describes wireless earphones connected via bluetooth protocol as an example.

In the embodiment of the present disclosure, an earphone which can establish a bluetooth connection with other devices such as electronic devices through a bluetooth protocol, a private protocol, or other command, and perform data transmission is defined as a bluetooth earphone, such as a TWS (True Wireless Stereo) earphone, a TWS Plus earphone, and so on. Of course, the bluetooth earphone can also be connected to other bluetooth earphones via bluetooth.

The mobile terminal can be connected with a bluetooth earphone or connected with a plurality of bluetooth earphones. Each bluetooth earphone can also be connected with one of the other bluetooth earphones or connected with a plurality of other bluetooth earphones. the plurality of bluetooth earphones may be two or more bluetooth earphones.

The mobile terminal and a plurality of bluetooth earphones can form a data transmitting system for data transmission. In the data transmitting system, the mobile terminal can send data to the bluetooth earphones connected with the mobile terminal via bluetooth, and each bluetooth earphone can also send data to each bluetooth earphone connected. Wherein, in the data transmitting system, the mobile terminal and the plurality of bluetooth earphones are connected in sequence thereby forming a connection loop, in which each of the plurality of bluetooth earphones corresponds to two transmission paths for transmitting audio data to the mobile terminal. Wherein the bluetooth earphone can transmit the audio data to the mobile terminal through the two transmission paths. Each of the plurality of bluetooth earphones in the data transmitting system is configured to receive audio data; determine a target device, wherein the target device is adjacent to the target bluetooth earphone in the connection loop and on the shorter of the two transmission paths, and the target device is one of the plurality of bluetooth earphones or the mobile terminal; and transmit the audio data to the target device until the audio data is transmitted to the mobile terminal.

As an embodiment, the mobile terminal and the plurality of bluetooth earphones are sequentially connected in head-to-tail manner, and the mobile terminal is connected between two bluetooth earphones of the plurality of bluetooth earphones. As shown in FIG. 1, in the data transmitting system, the mobile terminal 400 is connected to the bluetooth earphone A, and the bluetooth earphone A is connected to the bluetooth earphone B via bluetooth. The bluetooth earphone B is connected with the bluetooth earphone A, and is also connected with the bluetooth earphone C. The bluetooth earphones connect in sequence until bluetooth earphone D is connected with a bluetooth earphone, and the bluetooth earphone D is connected with the mobile terminal 400. The bluetooth earphone A is simultaneously connected to one other bluetooth earphone and the mobile terminal, and the bluetooth earphone D is simultaneously connected to one other bluetooth earphone and the mobile terminal. In this embodiment, the number of bluetooth earphones between the bluetooth earphone A and the bluetooth earphone D is not limited. It can be one or more, or can be zero.

As shown in FIG. 1, in this embodiment, each bluetooth earphone of the plurality of earphones has two transmission paths for transmitting audio data to the mobile terminal, which are the transmission paths shown by direction 1 and direction 2 in FIG. 1. The two transmission paths of each bluetooth earphone correspond to two adjacent devices, and the two adjacent devices are on the two transmission paths respectively. As shown in FIG. 1, the two devices adjacent to one bluetooth earphone of the plurality of earphones may be two adjacent bluetooth earphones, or a bluetooth earphone and a mobile terminal.

For example, as shown in FIG. 1, in the two transmission paths corresponding to the bluetooth earphone A, the transmission path in direction 1 is the path that the bluetooth earphone A transmits the audio data to the mobile terminal. The transmission path shown in direction 2 is the path that bluetooth earphone A transmits the audio data to bluetooth earphone B. Then the bluetooth earphone B transmits the audio data to the bluetooth earphone C, and the bluetooth earphone C transmits the audio data to the next bluetooth earphone until the audio data transmitted to the bluetooth earphone D in direction 2 as shown in FIG. 1. The bluetooth earphone D then transmits the audio data to the mobile terminal. For the bluetooth earphone A, the mobile terminal adjacent to the bluetooth earphone A is on the transmission path of the direction 1, and the bluetooth earphone B adjacent to the bluetooth earphone A is on the transmission path of the direction 2.

For example, as shown in FIG. 1, in the two transmission paths corresponding to the bluetooth earphone B, the transmission path in direction 1 is the path that bluetooth earphone B transmits the audio data to the bluetooth earphone A, and the bluetooth earphone A transmits the audio data to the mobile terminal. The transmission path shown in direction 2 is the path that bluetooth earphone B transmits the audio data to bluetooth earphone C, the bluetooth earphone C transmits the audio data to the next bluetooth earphone until the audio data is sequentially transmitted to the bluetooth earphone D in the direction 2 as shown in FIG. 1. The bluetooth earphone D then transmits the audio data to the mobile terminal. For the bluetooth earphone B, the bluetooth earphone A adjacent to the bluetooth earphone B is on the transmission path of the direction 1, and the bluetooth earphone C adjacent to the bluetooth earphone B is on the transmission path of the direction 2.

As another embodiments, the plurality of bluetooth earphones include a main earphone and a plurality of slave earphones in the data transmitting system. In the connection loop formed by the mobile terminal and the plurality of bluetooth earphones, the mobile terminal connects with the main earphone via bluetooth, the main earphone and the plurality of slave earphones are sequentially connected in head-to-tail manner, and the main earphone is connected between two slave earphones of the plurality of slave earphones. Of course, in this embodiments, it can also be understood that the data transmitting system further includes a main earphone on the basis of the plurality of slave earphones. It can also be understood that, in addition to the plurality of bluetooth earphones in the foregoing embodiment, a bluetooth earphone as the main earphone is also included, and the plurality of bluetooth earphones of the foregoing embodiments are used as the plurality of slave earphones.

Figure 2:
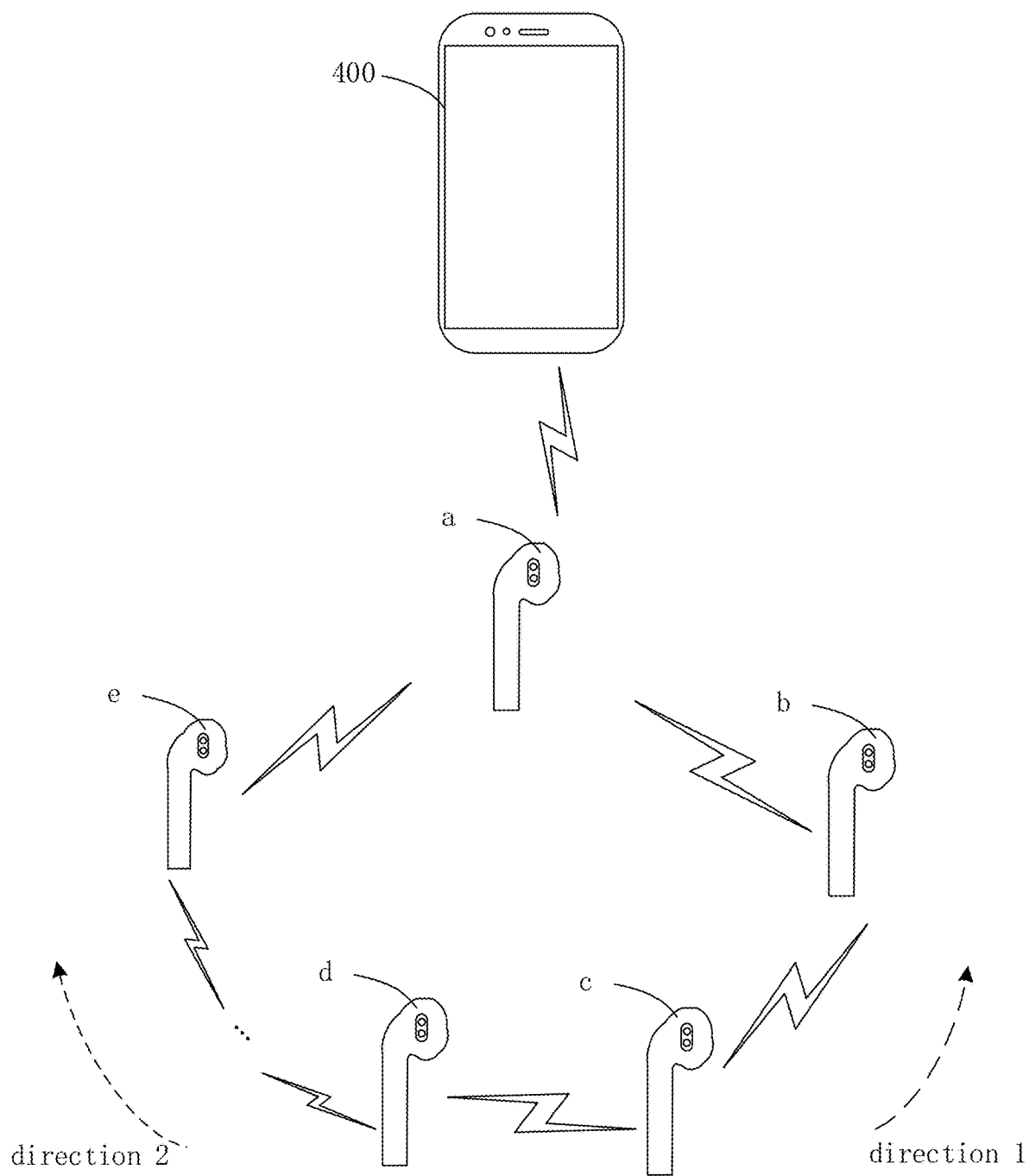
FIG. 2 is another schematic view of a data transmitting system according to embodiments of the present disclosure.

As shown in FIG. 2, in the data transmitting system, the bluetooth earphone a serves as the main earphone, and the other bluetooth earphones serve as the plurality of slave earphones. The mobile terminal 400 is connected with the bluetooth earphone a via bluetooth. The main earphone a is connected with the slave earphone b, and the earphone b is connected with the slave earphone c. The slave earphone c is connected with the slave earphone b and also connected with the earphone d. The earphones are connected sequentially like this until the slave earphone e is connected with a slave earphone, the slave earphone e is then connected with the main earphone a. Wherein, the main earphone a is simultaneously connected to two slave earphones of the plurality of slave earphones and the mobile terminal. Each slave earphone is simultaneously connected with two bluetooth earphones, for example, slave earphone b is connected with the main earphone a and the slave earphone c, and slave earphone c is connected with the slave earphone b and the slave earphone d. In this embodiment, the number of the plurality of slave earphones is not limited, and can be two or more.

As shown in FIG. 2, in this embodiment, the main earphone may have only one transmission path for transmitting the audio data to the mobile terminal, that is, the main earphone directly transmits the audio data to the mobile terminal. Of course, the main earphone may also have more than one transmission path for transmitting the audio data to the mobile terminal. For example, the main earphone transmits the audio data to an adjacent slave earphone, and the adjacent slave earphone sequentially transmits the audio data to other slave earphones until the audio data is transmitted to the main earphone and then transmitted to the mobile terminal by the main earphone. The main earphones may be adjacent to one of the plurality of slave earphones or the mobile terminal.

In this embodiments, each of the slave earphones has two transmission paths for transmitting the audio data to the mobile terminal, the two transmission paths are shown by direction 1 and direction 2 in FIG. 2. The two transmission paths of each bluetooth earphone correspond to two adjacent devices, and the two adjacent devices are on the two transmission paths respectively. As shown in FIG. 2, the two devices adjacent to one slave bluetooth earphone of the plurality of slave earphones are two bluetooth earphones, which may be two slave earphones, or one main earphone and one slave earphone.

For example, as shown in FIG. 2, in the two transmission paths corresponding to the slave earphone b, the transmission path shown in direction 1 is to transmit the audio data from the slave earphone b to the main earphone a, and then the audio data is transmitted from the main earphone a to the mobile terminal. The transmission path shown in direction 2 is to transmit the audio data from the slave earphone b to the slave earphone c, and the audio data is transmitted from the earphone c to the slave earphone d. The slave earphone d transmits the audio data to the next slave earphone until the audio data transmitted to the slave earphone e in direction 2 as shown in FIG. 2. Then the audio data is transmitted from the slave earphone e to the main earphone a, and the main earphone a transmits the audio data to the mobile terminal. For the slave earphone b, the main earphone a adjacent to the slave earphone b is on the transmission path of direction 1, and the adjacent slave earphone c is on the transmission path of direction 2.

For another example, as shown in FIG. 2, in the two transmission paths corresponding to the slave earphone c, on the transmission path of direction 1, the audio data is transmitted from the slave earphone c to the slave earphone b. The slave earphone b transmits the audio data to the main earphone a, then the audio data is transmitted from the main earphone a to the mobile terminal. On the transmission path of direction 2, the audio data is transmitted from the slave earphone c to the slave earphone d. The slave earphone d transmits the audio data to the next slave earphone, until the audio data is sequentially transmitted to the slave earphone e, the slave earphone e transmits the audio data to the main earphone a, then the audio data is transmitted from the main earphone a to the mobile terminal. For the slave earphone c, the adjacent slave earphone b is on the transmission path of direction 1, and the adjacent slave earphone d is on the transmission path of direction 2.

In the embodiment of the present disclosure, each of the plurality of bluetooth earphones in the data transmitting system transmits the audio data to the mobile terminal when it receives the audio data. For example, the bluetooth earphone includes a voice acquisition unit, such as a microphone, through which users can input voice. The input voice information of the voice is sampled and converted into audio data by the bluetooth earphone, and the audio data needs to be sent to the mobile terminal. The embodiments of the present disclosure provides a data transmitting method, which selects a transmission path for transmitting the audio data when the bluetooth earphone performs audio data transmission.

The data transmitting method, and the mobile terminal 400 provided by the embodiments of the present disclosure will be described in detail below through specific embodiments.

Figure 3:
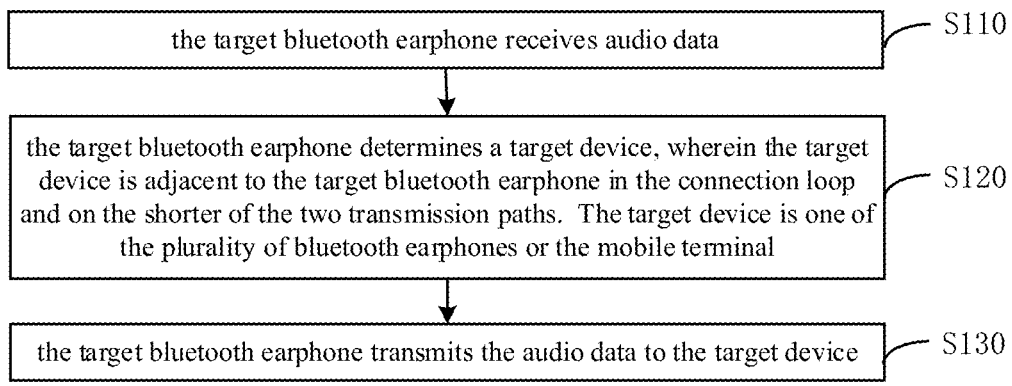
FIG. 3 is a schematic flowchart view of a data transmitting method according to an embodiment of the present disclosure.

Referring to FIG. 3, the embodiment of the present disclosure provides a data transmitting method, which is applied to a bluetooth earphone in the data transmitting system. In this embodiment, one of the plurality of bluetooth earphones in the data transmitting system is taken as an example. The bluetooth earphone can be any bluetooth earphone, and the bluetooth earphone is defined as a target bluetooth earphone. As shown in FIG. 3, the method includes the following operations.

Operation S110: the target bluetooth earphone receives audio data.

The target bluetooth earphone can receive the audio data.

The audio data received by the target bluetooth earphone can be the voice information input by the user through the audio acquisition unit of the bluetooth earphone. For example, the user inputs voice information through the microphone of the target bluetooth earphone, and the target bluetooth earphone acquires the voice information and converts it into the audio data. The acquisition process and conversion process is not limited in the embodiment of the present disclosure. For example, the sound information is converted into a series of voltage-varying signals through the microphone, and then converted the signals into digital audio data by sampling.

The audio data received by the target bluetooth earphone can also be sent by other bluetooth earphones. For example, after one bluetooth earphone of the plurality of earphones receives the voice information input by the user and converts it into the audio data, the audio needs to be sent to the mobile terminal. The target bluetooth earphone is on the shorter path that bluetooth earphone transmits the audio data to the mobile terminal, and the target bluetooth earphone receives the audio data sent by the bluetooth earphones via bluetooth.

Operation S120: the target bluetooth earphone determines a target device, wherein the target device is adjacent to the target bluetooth earphone in the connection loop and on the shorter of the two transmission paths. The target device is one of the plurality of bluetooth earphones or the mobile terminal.

When the target bluetooth earphone receives the audio data, the target bluetooth earphone needs to transmit the audio data to the mobile terminal. The target bluetooth earphone can determine the shorter transmission path from the two transmission paths corresponding to the target bluetooth earphone, the target bluetooth earphone determines the device adjacent to the target bluetooth earphone on the shorter transmission path as the target device. It can be understood that the target device may be one of the plurality of bluetooth earphones or the mobile terminal.

Operation S130: the target bluetooth earphone transmits the audio data to the target device.

The audio data is transmitted to the target device via bluetooth.

If the target device is one of the plurality of bluetooth earphones, the target device can send the audio data to next device on the shorter transmission path after receiving the audio data, until the audio data is sent to the mobile terminal.

If the target device is the mobile terminal, the audio data is successfully transmitted to the mobile terminal when the audio data is transmitted to the target device.

In the embodiments of the present disclosure, after receiving the audio data, the shorter transmission path can be selected by the bluetooth earphone received the audio data to transmit the audio data to the mobile terminal for reducing transmission time.

Figure 4:
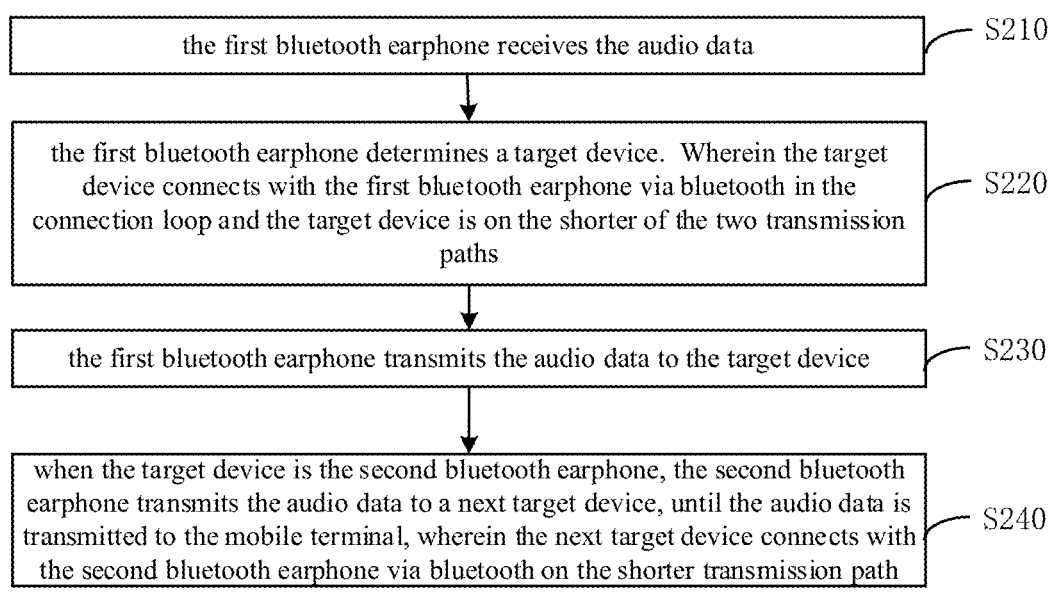
FIG. 4 is a schematic flowchart view of a data transmitting method according to another embodiment of the present disclosure.

The data transmitting method provided in the embodiments of the disclosure also includes the transmission of the audio data in the data transmitting system. The plurality of bluetooth earphones in the data transmitting system include a first bluetooth earphone and a second bluetooth earphone. Specifically, referring to FIG. 4, the data transmitting method includes the following operations.

Operation S210: the first bluetooth earphone receives the audio data.

The first bluetooth earphone can be any bluetooth earphone in the data transmitting system, such as any one of the bluetooth earphones A to D as shown in FIG. 1, or any of the bluetooth earphones a to e as shown in FIG. 2. The audio data received by the first bluetooth earphone may be obtained by acquiring sound signals through the voice acquisition unit and converting the sound signals into the audio data through the first bluetooth earphone. In the embodiment of the present disclosure, the audio data obtained by the first bluetooth earphone by acquiring sound signals and converting the sound signals can be defined as a first audio data. The audio data received by the first bluetooth earphone can also be transmitted from one of the plurality of bluetooth earphones which is adjacent to the target bluetooth earphone, and the audio data received from one of the plurality of bluetooth earphones can be defined as a second audio data. That is, the first bluetooth earphone acquires the sound signals through the voice acquisition unit and converts the sound signals into the first audio data; and the first bluetooth earphone receives the second audio data from one of the plurality of bluetooth earphones which is adjacent to the target bluetooth earphone.

Wherein, if the time when the first audio data is received is different from the time when the second audio data is received, the received first audio data and the second audio data are respectively transmitted. That is, the first audio data is transmitted when the first audio data is received, and the second audio data is transmitted when the second audio data is received.

In the embodiments, the first bluetooth earphone determines whether the second audio data is received when the first audio data is obtained. The first bluetooth earphone mixes the first audio data and the second audio data to form mixed audio data, and transmits the mixed audio data to the target device, when the first bluetooth earphone determines the second audio data is received. The first bluetooth earphone transmits the first audio data to the target device when the target bluetooth earphone determines the second audio data isn't received.

The first bluetooth earphone determines whether the first audio data is obtained when the second audio data is received. The first bluetooth earphone mixes the first audio data and the second audio data to form mixed audio data, and transmits the mixed audio data to the target device, when the target bluetooth earphone determines the first audio data is obtained. The first bluetooth earphone transmits the second audio data to the target device when the target bluetooth earphone determines the first audio data isn't obtained.

The first bluetooth earphone may also receive the first audio data and the second audio data simultaneously. As an embodiment, if the first bluetooth earphone receives the first audio data and the second audio data at the same time, the first audio data and the second audio data can be mixed to form mixed audio data, and transmitting the mixed audio data to the target device.

The specific way in which the first audio data and the second audio data are mixed is not limited in the embodiment of the present disclosure. For example, the audio data obtained by mixing the first audio data and the second audio data can be defined as the mixed audio data. The sampling values of the first audio data and the second audio data at the same time are superimposed to obtain sampling values corresponding to that time in the mixed audio data. If there is a sampling value corresponding to a certain time in the first audio data and no sampling value corresponding to the certain time in the second audio data, the sampling value corresponding to the certain time in the mixed audio data is the sampling value corresponding to the certain time in the first audio data corresponding the certain time. If there is a sampling value corresponding to a certain time in the second audio data and no sampling value corresponding to the certain time in the first audio data, the sampling value corresponding to the certain time in the mixed audio data is the sampling value corresponding to the certain time in the second audio data corresponding the certain time. In this embodiment, the mixed audio data is used for transmission to the target device.

As an embodiment, if the first audio data and the second audio data are received by the first bluetooth earphone simultaneously, the first audio data and the second audio data can also be respectively transmitted to the target device as independent audio data, and the transmission can be simultaneous.

Operation S220: the first bluetooth earphone determines a target device. Wherein the target device connects with the first bluetooth earphone via bluetooth in the connection loop and the target device is on the shorter of the two transmission paths.

The first bluetooth earphone determines the target device to be sent before transmitting the received audio data.

As an embodiment, the first bluetooth earphone can calculate the number of bluetooth earphones on the two transmission paths respectively, and determine one of the two transmission paths with the smaller bluetooth earphones as the shorter transmission path. For example, if the number of bluetooth earphones on one transmission path of the first bluetooth earphone is 5 and the number of bluetooth earphones on the other transmission path is 6, the transmission path with 5 bluetooth earphones is determined as the shorter transmission path. The bluetooth earphone adjacent to the first bluetooth earphone on the shorter transmission path is determined as the target device.

In this embodiment, if the number of bluetooth earphones on the two paths is the same, any one transmission path can be selected for transmitting the audio data; or the transmission path through which the audio data was previously transmitted is selected as the current transmission path for transmitting audio data; or the transmission path with the strongest average signal strength is selected as the transmission path for transmitting audio data.

Wherein, in the process of connecting the mobile terminal and the bluetooth earphone, each bluetooth earphone can record the number of bluetooth earphones in the transmission path between the earphone and the mobile terminal. For example, the bluetooth earphone connected to the mobile terminal transmits its own address to another bluetooth earphone when it is connected to the another bluetooth earphone, which receives and saves the address. When the bluetooth earphone is connected to the next bluetooth earphone, it will send its own address and the saved address to the next bluetooth earphone. By analogy, each bluetooth earphone can save the address of each bluetooth earphone on the two transmission paths. According to the number of bluetooth earphone addresses corresponding to the two transmission paths, the number of bluetooth earphones on the two paths can be calculated respectively.

As another example, each bluetooth earphone sets a parameter to records the number of bluetooth earphones on the transmission path, and the parameter value can be initialized to zero. The bluetooth earphone connected to the mobile terminal keeps the parameter value at 0. When the bluetooth earphone connected with mobile terminal connects with other bluetooth earphones, the value of the parameter in the bluetooth earphone connected with mobile terminal is sent to the bluetooth earphone connected with it. The bluetooth earphone that receives the parameter value adds 1 to the received parameter to save as its own parameter, and so on. On one transmission path of the two transmission paths, the parameter value of each bluetooth earphone is added 1 on the basis of the parameter value of the adjacent bluetooth earphone, and the adjacent bluetooth earphone is closer to the mobile terminal on the transmission path. Thus, each bluetooth earphone can obtain the number of bluetooth earphones on the two transmission paths through this parameter value.

Specifically, the two transmission paths include a first path and a second path, two parameters are stored in the target bluetooth earphone. The two parameters include a first parameter and a second parameter, the first parameter is used to record the number of bluetooth earphones on the first path, the second parameter is used to record the number of bluetooth earphones on the second path. The operation of the first bluetooth earphone calculating the number of bluetooth earphones on the two transmission paths respectively includes calculating the number of bluetooth earphones on the first path according to the first parameter and calculating the number of bluetooth earphones on the second path according to the second parameter.

Wherein the first parameter can be initialized to zero, the operation of calculating the number of bluetooth earphones on the first path according to the first parameter includes the following operations. The first bluetooth earphone sends the first parameter stored in the first bluetooth earphone to the next bluetooth earphone on the first path, when the first bluetooth earphone is connected between the mobile terminal and one of the plurality of bluetooth earphones, and the first bluetooth earphone is the first bluetooth earphone on the first path. When the target bluetooth earphone is connected between two bluetooth earphones of the plurality of bluetooth earphones, the first bluetooth earphone can receive the first parameter from a previous bluetooth earphone on the first path, the first bluetooth earphone updates the first parameter stored in the target bluetooth earphone to a new first parameter, wherein the new first parameter equal to the first parameter received from the previous bluetooth earphone plus 1, and the first bluetooth earphone can determine the first parameter stored in the target bluetooth earphone as the number of bluetooth earphones on the first path, after updating the first parameter stored in the target bluetooth earphone to the new first parameter.

Wherein the second parameter is initialized to zero, the operation of calculating the number of bluetooth earphones on the second path according to the second parameter can include the following operations. The first bluetooth earphone sends the second parameter stored in the first bluetooth earphone to the next bluetooth earphone on the second path, when the first bluetooth earphone is connected between the mobile terminal and one of the plurality of bluetooth earphones, and the first bluetooth earphone is the first bluetooth earphone on the second path. When the first bluetooth earphone is connected between two bluetooth earphones of the plurality of bluetooth earphones, the first bluetooth earphone can receive the second parameter from a previous bluetooth earphone on the second path, the target bluetooth earphone can update the second parameter stored in the first bluetooth earphone to a new second parameter, wherein the new second parameter equal to the second parameter received from the previous bluetooth earphone plus 1, and the target bluetooth earphone can determine the second parameter stored in the target bluetooth earphone as the number of bluetooth earphones on second first path, after updating the second parameter stored in the first bluetooth earphone to the new second parameter.

For example, in the data transmitting system as shown in FIG. 2, for the bluetooth earphone c, the number of bluetooth earphones can be determined to be 2 in the transmission path of direction 1. During the connection process, the bluetooth earphone a can record the value of the first parameter corresponding to transmission path of direction 1 as 0. The bluetooth earphone a sends the value 0 of the first parameter to the bluetooth earphone b connected to it, then the bluetooth earphone b updates the first parameter stored in the target bluetooth earphone to a new first parameter, and the new first parameter equal to the first parameter received from the bluetooth earphone a plus 1, and the new first parameter equal to 1. The bluetooth earphone b transmits the value 1 of the new first parameter to the bluetooth earphone c. The bluetooth earphone c adds 1 to the first parameter received from the bluetooth earphone b, and determine the value of the first parameter stored in the bluetooth earphone c is 2. Therefore, the number of bluetooth earphones on the transmission path of the direction 1 of the bluetooth earphone c can be determined as 2 according to the value of the first parameter. If the bluetooth earphone d records the second parameter value is x, it indicates the number of bluetooth earphones between the bluetooth earphone d and mobile terminal on the transmission path is x, the transmission path is from mobile terminal to the main earphone a, the slave earphone e and until to the slave earphone d. When the bluetooth earphone d is connected to the bluetooth earphone c, the value x of the second parameter is sent to the bluetooth earphone c. The bluetooth earphone c adds 1 to the value x, and the value of the second parameter can be recorded as (x+1) by the bluetooth earphone c. Therefore, the bluetooth earphone c can determine that the number of bluetooth earphones in the transmission path of the bluetooth earphone c in direction 2 is (x+1) according to the value of the second parameter (x+1).

As an embodiment, if the first bluetooth earphone is a bluetooth earphone directly connected to the mobile terminal, the first bluetooth earphone can directly send the audio data to the mobile terminal without relaying through other bluetooth earphones. Therefore, the mobile terminal can be determined as the target device. It can be understood that the identity information is exchanged between the interconnected mobile terminal and the bluetooth earphone, and between two interconnected bluetooth earphones, so that each bluetooth earphone can know whether it is connected to the bluetooth earphone or the mobile terminal.

As an embodiment, if the first bluetooth earphone is the main earphone, the mobile terminal can be determined as the target device because the main earphone is directly connected to the mobile terminal, and the transmission path is the shorter.

As an embodiment, if the data transmitting system is as illustrated in FIG. 2, all the audio data from the slave earphones needs to be sent to the mobile terminal through the main earphone. If the first bluetooth earphone is one of the plurality of slave earphone and the first bluetooth earphone is connected with the main earphone via bluetooth, the audio data is transmitted to the main earphone by the first bluetooth earphone, then the main earphone transmits the audio data to the mobile terminal. The transmission path is the shorter, so the main earphone is determined as the target device. It can be understood that when the main earphone is connected with the first bluetooth earphone, the identity information is exchanged with each other, so that the first bluetooth earphone can recognize the main earphone from the bluetooth earphones connected to it.

As an embodiment, if the audio data transmitted by the first bluetooth earphone includes the second audio data, the first bluetooth earphone is on the shorter transmission path from another bluetooth earphone to the mobile terminal, and the shorter transmission path from the first bluetooth earphone to the mobile terminal should also be the shorter transmission path from the another bluetooth earphone to the mobile terminal. The target device on the shorter transmission path should be one of the two devices adjacent to the first bluetooth earphone and is different from the device which transmits the second audio data to the first bluetooth earphone. That is, there are two devices adjacent to the target bluetooth earphone in the connection loop, the first bluetooth earphone can determine one of the two devices as the target device, wherein the second audio data is not transmitted from the target device.

For example, as shown in FIG. 2, if the slave earphone c is the first bluetooth earphone and receives the second audio data transmitted from the earphone d. It indicates that the shorter transmission path from the earphone d to the mobile terminal is the transmission path in the direction 1. The shorter transmission path is from the slave earphone d to the mobile terminal through the slave earphone c, the slave earphone b and the main earphone a. In the two transmission paths of the slave earphone c, the transmission path in the direction 1 is shorter than the transmission path from the slave earphone d in the direction 1. Besides, the transmission path from the slave earphone c in the direction 2 is longer than the transmission path from the earphone d in the direction 2. The direction of the shorter transmission path from the slave earphone c is the same as that from the slave earphone d. That is to say, the target device on the shorter transmission path of the slave earphone c is one of the two adjacent devices and different from the earphone d that transmits the second audio data, that is, the target device is the slave earphone b.

Operation S230: the first bluetooth earphone transmits the audio data to the target device.

Operation S240: when the target device is the second bluetooth earphone, the second bluetooth earphone transmits the audio data to a next target device, until the audio data is transmitted to the mobile terminal, wherein the next target device connects with the second bluetooth earphone via bluetooth on the shorter transmission path.

The first bluetooth earphone transmits the audio data to the determined target device.

If the target device is the mobile terminal, the transmission of the audio data in the data transmitting system is completed.

If the target device is one of the plurality of bluetooth earphone, the target device continues to transmit the audio data.

Wherein, the earphone receives the audio data from the first bluetooth earphone is defined as the second bluetooth earphone. The second bluetooth earphone then transmits the audio data to the next target device connected via bluetooth on the shorter transmission path, which is adjacent to the second bluetooth earphone on the shorter transmission path.

That is, when the second bluetooth earphone receives the audio data, it determines the target device on the shorter transmission path among the two transmission paths. If the target device is a mobile terminal, the transmission of the audio data in the data transmitting system is completed after the audio data is transmitted to the target device. If the target device is the bluetooth earphone, then the audio data is transmitted to the next target device on the shorter transmission path of the bluetooth earphone, the audio data is transmitted in sequence until it is transmitted to the mobile terminal.

The data transmitting system shown in FIG. 2 is taken as an example for specific description. When the bluetooth earphone c in FIG. 2 receives the audio data, the bluetooth earphone c determines the transmission path in direction 1 as the shorter transmission path. On the shorter transmission path, the target device of the bluetooth earphone c is the bluetooth earphone b, and the audio data is transmitted to the bluetooth earphone b. The bluetooth earphone b receives the audio data, and determines that its target device is the bluetooth earphone a, and transmits the audio data to the bluetooth earphone a. The bluetooth earphone a is connected to the mobile terminal, and the mobile terminal is determined as the target device of the bluetooth earphone a. The bluetooth earphone a transmits the audio data to the mobile terminal to complete the transmission of the audio data.

In the embodiments of the present disclosure, the audio data is received by the bluetooth earphone and needs to be transmitted to the mobile terminal. Specifically, for a bluetooth earphone, the audio data can be acquired by its voice acquisition unit, or the audio data is acquired by other bluetooth earphones through a voice acquisition unit and be transmitted to the bluetooth earphone. The audio data can include a first label for instructing the bluetooth earphone to transmit the audio data to the mobile terminal. That is to say, if the bluetooth earphone receives the audio data having the first label, it performs the foregoing process of transmitting the audio data to the mobile terminal.

In addition, the mobile terminal can also send audio data to the bluetooth earphone. Specifically, the mobile terminal transmits the audio data to the bluetooth earphone connected with the mobile terminal, and the bluetooth earphone connected with the mobile terminal transmits the audio data to the next bluetooth earphone connected with it. The audio data is sequentially transmitted, so that all the bluetooth earphones can receive the audio data transmitted from the mobile terminal. The audio data transmitted from the mobile terminal to the bluetooth earphone can include a second label. If the bluetooth earphone receives the audio data having the second label, the audio data is transmitted to other bluetooth earphones.

That is, the first bluetooth earphone can determine whether the audio data includes a first label or a second label, wherein the first label is used to instruct the bluetooth earphone to send the audio data to the mobile terminal, the second label is used to indicate that the audio data is transmitted from the mobile terminal to the plurality of bluetooth earphones. The first bluetooth earphone can transmit the audio data to the target device when the audio data include the first label. When the audio data includes the second label, the first bluetooth earphone determines whether the target device is the bluetooth earphone or the mobile terminal. The first bluetooth earphone transmits the audio data to the target device when the target device is the bluetooth earphone, and the first bluetooth earphone ends the transmission of the audio data when the target device is the mobile terminal.

In the data transmitting system provided by the embodiments of the present disclosure, the mobile terminal and the plurality of bluetooth earphones are connected in sequence thereby forming a connection loop. The bluetooth earphone may receive audio data transmitted by the mobile terminal from both sides of the two transmission paths. Therefore, if a bluetooth earphone has received audio data with a second label, it can refuse to accept the same audio data with the second label, and the audio data is no longer sent to other bluetooth earphones.

In the embodiment of the present disclosure, the mobile terminal can send the audio data received from the bluetooth earphone to other mobile terminals through the network. The mobile terminal can also receive audio data from other mobile terminals through the network and send it to each bluetooth earphone.

Optionally, the data transmitting system can further include another mobile terminal been connected with the mobile terminal through the network. The mobile terminal can transmit the audio data received from the first bluetooth earphone to the another mobile terminal.

In the embodiments of the present disclosure, the bluetooth earphone receives the audio data which is transmitted to the mobile terminal, and determines the target device that transmits the audio data to the mobile terminal. The target device is adjacent to the bluetooth earphone on the shorter transmission path. The bluetooth earphone transmits the audio data to the target device. If the target device is one of the plurality of bluetooth earphones, the similar transmission process of the bluetooth earphone is performed again, that is, the audio data is transmitted to the adjacent device on its shorter transmission path, until the audio data is transmitted to the mobile terminal. In the data transmitting system, the bluetooth earphone can select the transmission path of the audio data according to the length of the transmission path, so as to reduce the amount of data processing and reduce the transmission time.

Figure 5:
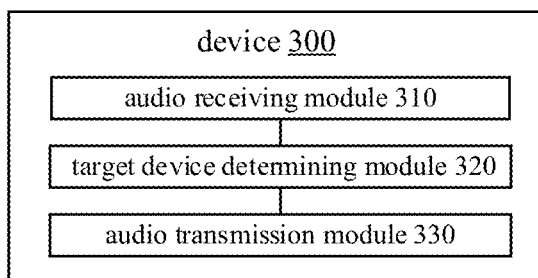
FIG. 5 is a functional block view of a data transmitting device according to embodiments of the present disclosure.

The embodiments of the present disclosure also provides a data transmission device 300, which is applied to the target bluetooth earphone. The target bluetooth earphone can be any bluetooth earphone in the data transmitting system. Referring to FIG. 5, the device 300 includes an audio receiving module 310 configured to receive audio data by the target bluetooth earphone; a target device determining module 320 configured to determine a target device, wherein the target device is adjacent to the target bluetooth earphone in the connection loop and on the shorter of the two transmission paths, and the target device is one of the plurality of bluetooth earphones or the mobile terminal; an audio transmission module 330 configured to transmit the audio data to the target device.

Optionally, the target bluetooth earphone includes a voice acquisition unit, such as a microphone, for voice acquisition. The audio receiving module 310 can be configured to acquire sound signals through the voice acquisition unit and converting the sound signals into the first audio data, or can also be configured to receive the second audio data from one of the plurality of bluetooth earphones which is adjacent to the target bluetooth earphone. When the first audio data and the second audio data are received at the same time, the audio transmission module 330 can be configured to mix the first audio data and the second audio data to form mixed audio data, and transmit the mixed audio data to the target device.

Optionally, the embodiments of the present disclosure may also include a shorter transmission path determining module for calculating the number of bluetooth earphones on the two transmission paths respectively, and determining one of the two transmission paths with the smaller number of bluetooth earphones as the shorter transmission path.

Optionally, the target device determining module 320 may be used to determine one of the two devices as the target device, wherein the second audio data is not transmitted from the target device.

Optionally, when the target bluetooth earphone is connected with the mobile terminal, the target device determining module 320 may be configured to determine the mobile terminal as the target device.

Optionally, when the target bluetooth earphone is the main earphone, the target device determining module 320 may be configured to determine the mobile terminal as the target device.

Optionally, when the target bluetooth earphone is a slave earphone and connected with the main earphone, the target device determining module 320 may be configured to determine the main earphone as the target device.

The embodiment of the present disclosure also provides a data transmitting system. Referring to FIG. 1 and FIG. 2, the data transmitting system includes a mobile terminal and a plurality of bluetooth earphones. The mobile terminal and the plurality of bluetooth earphones are connected in sequence thereby forming a connection loop, each of the plurality of bluetooth earphones corresponds to two transmission paths for transmitting audio data to the mobile terminal.

As some embodiments, as shown in FIG. 1, in the connection loop formed by the mobile terminal and the plurality of bluetooth earphones, the mobile terminal and the plurality of bluetooth earphones are sequentially connected in head-to-tail manner, and the mobile terminal is connected between two bluetooth earphones of the plurality of bluetooth earphones.

In the connection process of the data transmitting system, the mobile phone is connected with the adjacent left and right earphones, and each earphone is connected with another earphone to form a two-way earphone loop.

As some embodiments, as shown in FIG. 2, the plurality of bluetooth earphones include a main earphone and a plurality of slave earphones, in the connection loop formed by the mobile terminal and the plurality of bluetooth earphones, the mobile terminal connects with the main earphone via bluetooth, the main earphone and the plurality of slave earphones are sequentially connected in head-to-tail manner, and the main earphone is connected between two slave earphones of the plurality of slave earphones.

In the connection process of the data transmitting system of the embodiments, the mobile phone can establish bluetooth connection with the main earphone, such as an HFP connection. The main earphone is connected with the adjacent left and right earphones to form a two-way earphone loop. When the main earphone receives the audio data transmitted by other earphones, the audio data can be transmitted to the mobile terminal through the HFP SCO link.

In the data transmitting system, the pairing passwords of each bluetooth earphone and the mobile terminal can be the same and equal to the pairing password between the bluetooth earphones. The pairing passwords between each slave earphone, the main earphone and the mobile terminal are the same. When the pairing password input by the mobile terminal is correct, the mobile terminal and the plurality of bluetooth earphones can be connected to form the connection loop.

It will be apparent to those skilled in the art that the above embodiments may be referred to each other for convenience and brevity of the description. For the specific working process of the device and the system as described above, references may be made to the corresponding process in the foregoing method embodiments, and details are not repeated here. The various embodiments and the implementations in the foregoing method embodiments can be executed by corresponding modules or units, which are no longer described in the embodiments of the present disclosure.

In several embodiments provided in this disclosure, the coupling between modules can be electrical, mechanical or other forms of coupling.

In addition, each functional module in each embodiment of the present disclosure can be integrated into one processing module, or each module can exist physically separately, or two or more modules can be integrated into one module. The above integrated modules can be implemented either in the form of hardware or in the form of software functional modules.

Figure 6:
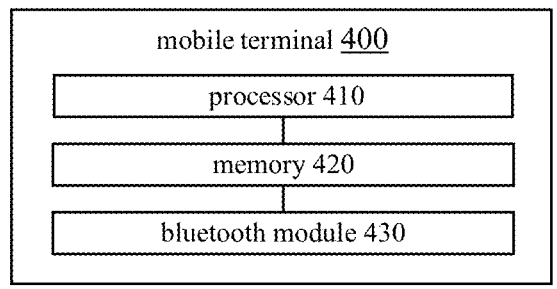
FIG. 6 is a schematic structural view of a mobile terminal according to embodiments of the present disclosure.

Another embodiments of the disclosure also provides a mobile terminal 400. The mobile terminal 400 can be a mobile terminal capable of running an application, such as a smart phone, a tablet computer, or a computer. As shown in FIG. 6, the mobile terminal 400 includes one or more processors 410 (only one is shown in the figure), a memory 420, a bluetooth module 430 and one or more computer programs. The one or more computer programs are stored in the memory 420 and configured to be executed by the one or more processors 410. The one or more computer programs are configured to execute the method of one or more embodiments above.

Each processor 410 can include one or more processing cores. Each processor 410 connects various parts of the entire mobile terminal 400 using various interfaces and lines. It performs various functions and processes data of the mobile terminal 400 by running or executing instructions, programs, code sets or instruction sets stored in memory 420 and calling data stored in memory 420. Optionally, the processor 410 can be implemented in at least one hardware form such as digital signal processing (DSP), a field-programmable gate array (FPGA), and a programmable logic array (PLA). The processor 410 can integrate one or more combinations of a central processing unit (CPU), a graphics processing unit (GPU), a modem, and the like. The CPU mainly deals with the operating system, user interface and disclosures; the GPU is responsible for rendering and drawing of the display content; the modem is used to process wireless communication. It can be understood that the above modem may not be integrated into the processor 410 and can be implemented separately by a communication chip.

The memory 420 can include a random access memory (RAM), or a read-only memory. The memory 420 can be used to store instructions, programs, code, code sets or instructions sets. The memory 420 can include a storage program area and a storage data area, wherein the storage program area can store instructions for implementing an operating system, instructions for implementing at least one function, instructions for implementing the various method embodiments described above, and the like. The storage data area can also store the data (such as a phone book, audio and video data, and chat record data) created by the mobile terminal 400 in use.

The bluetooth module 430 may refer to a set of basic circuit of chips integrated bluetooth function for wireless network communication. The bluetooth module 430 is electrically connected to the processor, and the mobile terminal can be connected to the bluetooth earphone through the bluetooth module 430. Wherein, the mobile terminal can include a plurality of bluetooth modules, and each bluetooth modules is used to connect different bluetooth earphones.

Figure 7:
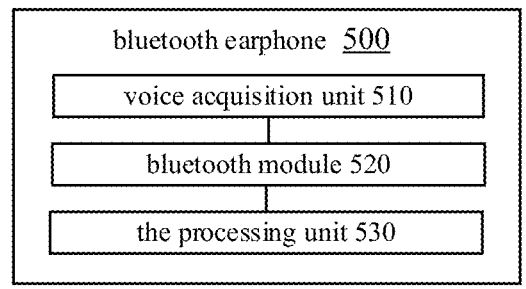
FIG. 7 is a schematic structural view of a bluetooth earphone according to embodiments of the present disclosure.

As shown in FIG. 7, the embodiments of the present disclosure further provides a bluetooth earphone 500. The bluetooth earphone includes a voice acquisition unit 510, a bluetooth module 520 and a processing unit 530. The voice acquisition unit 510 and the bluetooth module 520 are connected to the processing unit 530, respectively.

The bluetooth module 520 is used to connect the bluetooth earphone with the mobile terminal and other bluetooth earphones. Wherein, the bluetooth earphone can include plurality of bluetooth modules, and different bluetooth modules are used to connect different devices. For example, the bluetooth earphone includes a first bluetooth module, a second bluetooth module, and a third bluetooth module. When the bluetooth earphone is used as the main earphone, the first bluetooth module is used to connect with the mobile terminal, and the second bluetooth module is used to connect with a bluetooth earphone, and the third bluetooth module is used to connect with another bluetooth earphone.

The voice acquisition unit 510 is used to collect voice information and send it to the processing unit.

The processing unit 530 is used to perform processing operations, such as sampling, encoding, filtering and the like, on the voice information to obtain the audio data. The processing unit is also used to receive the audio data transmitted by other bluetooth earphones and mix it with the audio data obtained by the voice acquisition unit.

The processing unit 530 is further configured to perform the method operations corresponding to the bluetooth earphone described in the above method embodiments.

Figure 8:
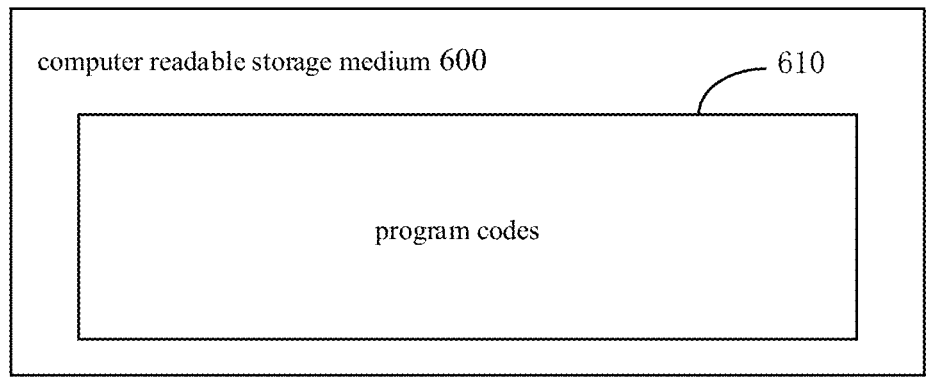
FIG. 8 is a storage unit for saving or carrying program codes for implementing a data transmitting method according to embodiments of the present disclosure.

Referring to FIG. 8, a schematic view of a computer readable storage medium provided by in the embodiment of the present disclosure is illustrated. Program code is stored in the computer readable storage medium 600, and the program code can be executable by a processor to execute the method of the embodiments described above.

The computer readable storage medium 600 can be an electronic memory such as a flash memory, an EEPROM (Electrically Erasable Programmable Read Only Memory), an EPROM, a hard disk, or a ROM. Alternatively, the computer readable storage medium 600 may be a non-transitory computer-readable storage medium. The computer readable storage medium 600 has a storage space for program code 610 that performs any of the method operations described above. The program code can be read from or written to one or more computer program products. Program code 610 can be compressed, for example, in a suitable form.

It should be noted that the above embodiments are only used to explain the technical solutions of the present disclosure, not to limit it. Although the present disclosure is described in detail with reference to the foregoing embodiments, it should be understood by those skilled in the art that they can still modify the technical solutions described in the foregoing embodiments, or the equivalently replace some of the technical features. These modifications and substitutions do not drive the essence of the corresponding technical solutions away from the spirit and scope of the technical solutions of the embodiments of the present disclosure.

What is claimed is:

1. A data transmitting method, applied to a target bluetooth earphone, the target bluetooth earphone applied to a data transmitting system, the data transmitting system comprising a mobile terminal and a plurality of earphones, the mobile terminal and the plurality of bluetooth earphones connected in sequence thereby forming a connection loop, in which each of the plurality of bluetooth earphones corresponds to two transmission paths for transmitting audio data to the mobile terminal, the target bluetooth earphone being one of the plurality of bluetooth earphones, the method comprising:
the target bluetooth earphone receiving audio data;
the target bluetooth earphone determining a target device, wherein the target device is adjacent to the target bluetooth earphone in the connection loop and on the shorter of the two transmission paths, and the target device is one of the plurality of bluetooth earphones or the mobile terminal; and
the target bluetooth earphone transmitting the audio data to the target device.

2. The method of claim 1, wherein the target bluetooth earphone comprises a voice acquisition unit, the operation of the target bluetooth earphone receiving audio data comprises:
the target bluetooth earphone acquiring sound signals through the voice acquisition unit and converting the sound signals into first audio data; and
the target bluetooth earphone receiving second audio data from one of the plurality of bluetooth earphones which is adjacent to the target bluetooth earphone;
wherein the operation of the target bluetooth earphone transmitting the audio data to the target device comprises:
the target bluetooth earphone mixing the first audio data and the second audio data to form mixed audio data, and transmitting the mixed audio data to the target device.

3. The method of claim 2, prior to the operation of the target bluetooth earphone mixing the first audio data and the second audio data, and transmitting the first audio data and the second audio data mixed to the target device, the method further comprising:
the target bluetooth earphone determining whether the second audio data is received when the first audio data is obtained;
the target bluetooth earphone performing the operation of mixing the first audio data and the second audio data to form mixed audio data, and transmitting the mixed audio data to the target device, when the target bluetooth earphone determines the second audio data is received,
the target bluetooth earphone transmitting the first audio data to the target device when the target bluetooth earphone determines the second audio data isn't received;
the target bluetooth earphone determining whether the first audio data is obtained when the second audio data is received;
the target bluetooth earphone performing the operation of mixing the first audio data and the second audio data to form mixed audio data, and transmitting the mixed audio data to the target device, when the target bluetooth earphone determines the first audio data is obtained,
the target bluetooth earphone transmitting the second audio data to the target device when the target bluetooth earphone determines the first audio data isn't obtained.

4. The method of claim 2, the operation of the target bluetooth earphone mixing the first audio data and the second audio data to form mixed audio data, and transmitting the mixed audio data to the target device comprising:
superimposing sampling values of the first audio data and the second audio data at the same time.

5. The method of claim 2, wherein there are two devices adjacent to the target bluetooth earphone in the connection loop, and the operation of the target bluetooth earphone determining a target device comprises:
determining one of the two devices as the target device, wherein the second audio data is not transmitted from the target device.

6. The method of claim 1, the operation of the target bluetooth earphone determining a target device comprising:
determining the mobile terminal as the target device when the target bluetooth earphone is connected with the mobile terminal.

7. The method of claim 1, prior to the operation of the target bluetooth earphone determining a target device, the method further comprising:
calculating the number of bluetooth earphones on the two transmission paths respectively;
determining one of the two transmission paths with the smaller number of bluetooth earphones as the shorter transmission path.

8. The method of claim 1, wherein the two transmission paths comprise a first path and a second path, two parameters are stored in the target bluetooth earphone, the two parameters comprise a first parameter and a second parameter, the first parameter is used to record the number of bluetooth earphones on the first path, the second parameter is used to record the number of bluetooth earphones on the second path, and the operation of calculating the number of bluetooth earphones on the two transmission paths respectively comprises calculating the number of bluetooth earphones on the first path according to the first parameter and calculating the number of bluetooth earphones on the second path according to the second parameter.

9. The method of claim 8, wherein the first parameter is initialized to zero, the operation of calculating the number of bluetooth earphones on the first path according to the first parameter comprises:
the target bluetooth earphone sending the first parameter stored in the target bluetooth earphone to the next bluetooth earphone on the first path, when the target bluetooth earphone is connected between the mobile terminal and one of the plurality of bluetooth earphones, and the target bluetooth earphone is the first bluetooth earphone on the first path;
the target bluetooth earphone receiving the first parameter from a previous bluetooth earphone on the first path, when the target bluetooth earphone is connected between two bluetooth earphones of the plurality of bluetooth earphones,
the target bluetooth earphone updating the first parameter stored in the target bluetooth earphone to a new first parameter, wherein the new first parameter equal to the first parameter received from the previous bluetooth earphone plus 1, and
the target bluetooth earphone determining the first parameter stored in the target bluetooth earphone as the number of bluetooth earphones on the first path.

10. The method of claim 8, wherein the second parameter is initialized to zero, the operation of calculating the number of bluetooth earphones on the second path according to the second parameter comprises:
the target bluetooth earphone sending the second parameter stored in the target bluetooth earphone to the next bluetooth earphone on the second path, when the target bluetooth earphone is connected between the mobile terminal and one of the plurality of bluetooth earphones, and the target bluetooth earphone is the first bluetooth earphone on the second path;
the target bluetooth earphone receiving the second parameter from a previous bluetooth earphone on the second path, when the target bluetooth earphone is connected between two bluetooth earphones of the plurality of bluetooth earphones,
the target bluetooth earphone updating the second parameter stored in the target bluetooth earphone to a new second parameter, wherein the new second parameter equal to the second parameter received from the previous bluetooth earphone plus 1, and
the target bluetooth earphone determining the second parameter stored in the target bluetooth earphone as the number of bluetooth earphones on second first path.

11. The method of claim 1, wherein the mobile terminal and the plurality of bluetooth earphones are sequentially connected in head-to-tail manner, and the mobile terminal is connected between two bluetooth earphones of the plurality of bluetooth earphones.

12. The method of claim 11, wherein the plurality of bluetooth earphones comprise a main earphone and a plurality of slave earphones, the mobile terminal connects with the main earphone via bluetooth, the main earphone and the plurality of slave earphones are sequentially connected in head-to-tail manner, and the main earphone is connected between two slave earphones of the plurality of slave earphones;
wherein the operation of the target bluetooth earphone determining a target device, comprises:
determining the mobile terminal as the target device when the target bluetooth earphone is the main earphone.

13. The method of claim 12, the operation of the target bluetooth earphone determining a target device, comprising:
determining the main earphone as the target device when the target bluetooth earphone is a slave earphone and connected with the main earphone.

14. The method of claim 1, prior to the operation of the target bluetooth earphone transmitting the audio data to the target device, further comprising:
determining whether the audio data comprises a first label or a second label, wherein the first label is used to instruct the bluetooth earphone to send the audio data to the mobile terminal, the second label is used to indicate that the audio data is transmitted from the mobile terminal to the plurality of bluetooth earphones;
performing the operation of the target bluetooth earphone transmitting the audio data to the target device when the audio data comprises the first label;
determining whether the target device is the bluetooth earphone or the mobile terminal, when the audio data comprises the second label;
performing the operation of the target bluetooth earphone transmitting the audio data to the target device when the target device is the bluetooth earphone,
ending the transmission of the audio data when the target device is the mobile terminal.

15. A data transmitting method, applied to a data transmitting system, the data transmitting system comprising a mobile terminal and a plurality of bluetooth earphones, the mobile terminal and the plurality of bluetooth earphones connected in sequence thereby forming a connection loop, each of the plurality of bluetooth earphones corresponding to two transmission paths for transmitting audio data to the mobile terminal, the plurality of bluetooth earphones comprising a first bluetooth earphone and a second bluetooth earphone, the method comprising:
the first bluetooth earphone receiving audio data;
the first bluetooth earphone determining a target device, wherein the target device connects with the first bluetooth earphone via bluetooth in the connection loop and the target device is on the shorter of the two transmission paths;
the first bluetooth earphone transmitting the audio data to the target device;
when the target device is the second bluetooth earphone, the second bluetooth earphone transmitting the audio data to a next target device, until the audio data is transmitted to the mobile terminal, wherein the next target device connects with the second bluetooth earphone via bluetooth on the shorter transmission path.

16. The method of claim 15, wherein the target bluetooth earphone comprises a voice acquisition unit, the operation of the first bluetooth earphone receiving audio data comprises:
the first bluetooth earphone acquiring sound signals through the voice acquisition unit and converting the sound signals into first audio data; and
the first bluetooth earphone receiving a second audio data sent from a bluetooth earphone adjacent the first bluetooth earphone;
wherein the operation of the first bluetooth earphone transmitting the audio data to the target device comprises:
the first bluetooth earphone mixing the first audio data and the second audio data to form mixed audio data, and transmitting the mixed audio data to the target device.

17. The method of claim 15, wherein the data transmitting system further comprises another mobile terminal been connected with the mobile terminal through network, the method further comprises:
the mobile terminal transmitting the audio data received from the first bluetooth earphone to the another mobile terminal.

18. A data transmitting system, wherein the data transmitting system comprises a mobile terminal and a plurality of bluetooth earphones, the mobile terminal and the plurality of bluetooth earphones are connected in sequence thereby forming a connection loop, each of the plurality of bluetooth earphones corresponds to two transmission paths for transmitting audio data to the mobile terminal, each of the plurality of bluetooth earphones is configured to:
receive audio data;
determine a target device, wherein the target device is adjacent to the target bluetooth earphone in the connection loop and on the shorter of the two transmission paths, and the target device is one of the plurality of bluetooth earphones or the mobile terminal; and
transmit the audio data to the target device until the audio data is transmitted to the mobile terminal.

19. The data transmitting system of claim 18, wherein the mobile terminal and the plurality of bluetooth earphones are sequentially connected in head-to-tail manner, and the mobile terminal is connected between two bluetooth earphones of the plurality of bluetooth earphones.

20. The data transmitting system of claim 18, wherein the plurality of bluetooth earphones comprise a main earphone and a plurality of slave earphones, the mobile terminal connects with the main earphone via bluetooth, the main earphone and the plurality of slave earphones are sequentially connected in head-to-tail manner, and the main earphone is connected between two slave earphones of the plurality of slave earphones.

* * * * *